United States Patent
Neely

[15] 3,660,117
[45] May 2, 1972

[54] BEVERAGE BREWING APPARTUS

[72] Inventor: Raymond J. Neely, Montgomeryville, Pa.
[73] Assignee: The Pennstar Company, Warminster, Pa.
[22] Filed: Dec. 4, 1970
[21] Appl. No.: 95,270

[52] U.S. Cl. ...........................................................99/289
[51] Int. Cl. .......................................................A47j 31/00
[58] Field of Search ................99/289, 289 T, 287, 283, 280, 99/281, 297

[56] References Cited

UNITED STATES PATENTS

| | | |
|---|---|---|
| 3,213,777 | 10/1965 | Heier.......................................99/289 |
| 3,349,690 | 10/1967 | Heier.......................................99/283 |
| 3,440,952 | 4/1969 | Merola....................................99/289 |
| 3,496,861 | 2/1970 | Stahler....................................99/289 |

*Primary Examiner*—Robert W. Jenkins
*Attorney*—Seidel, Gonda & Goldhammer

[57] ABSTRACT

Apparatus for use in brewing single cup quantities of a beverage from freshly ground charges of beverage material. A simplified apparatus is provided wherein the number of structural elements is greatly reduced and the expense of the entire apparatus is substantially less than that encountered with respect to prior apparatus. A series of cams is provided for operating the component parts of the apparatus and a motor for driving the cam shaft is provided. The profiles of the various cams are interrelated to reduce the load on the motor.

6 Claims, 8 Drawing Figures

FIG. 1

INVENTOR
RAYMOND J. NEELY
BY
Seidel, Gonda & Goldhammer
ATTORNEYS

INVENTOR
RAYMOND J. NEELY
BY
Seidel, Gonda & Goldhammer
ATTORNEYS

INVENTOR
RAYMOND J. NEELY

BY
Seidel, Gonda & Goldhammer
ATTORNEYS

INVENTOR
RAYMOND J. NEELY
BY
Seidel, Gonda & Goldhammer
ATTORNEYS

BEVERAGE BREWING APPARTUS

DISCLOSURE OF THE INVENTION

This invention relates to a beverage brewing apparatus and more particularly, to apparatus for rapidly preparing cup size quantities of hot coffee or the like from a freshly ground charge of beverage material.

Beverage brewing devices for preparing single cup quantities of beverage material are known. See, for example, U.S. Pat. No. 3,349,690. While the apparatus disclosed in U.S. Pat. No. 3,349,690 has performed highly satisfactorily, such apparatus is both complex and expensive. The forces developed in operating the various components of the beverage brewing apparatus set forth in U.S. Pat. No. 3,349,690 are substantial and accordingly, a powerful motor has been required.

Due to the complexity and cost of prior art beverage brewing apparatus of the type set forth in U.S. Pat. No. 3,349,690, such apparatus have been used almost exclusively in large vending machines. Such apparatus has not been suitable for incorporation into vending machines which could be utilized in the home, office and other locations where a small capacity automatic vending machine is desired.

It is an object of the present invention to provide a beverage brewing apparatus which is simple in structure and yet, highly effective in use.

It is another object of the present invention to provide a beverage brewing apparatus which eliminates substantial structure from prior art brewing machines while continuing to perform the same function.

It is a further object of the present invention to provide a beverage brewing apparatus which is sufficiently inexpensive to manufacture so that it may be incorporated into home brewers, office brewers, and the like.

It is a still further object of the present invention to provide a beverage brewing apparatus wherein the structure is so designed that the size of the motor required for operation of the apparatus is substantially reduced.

Other objects will appear hereinafter.

The above and other objects are accomplished by means of the present invention. The present invention is directed to a beverage brewing apparatus similar to that shown and described in U.S. Pat. No. 3,349,690 but eliminating substantial structure from the device shown in such patent while retaining the function thereof. While the present invention is suitable for use in large size vending machines for use in the vending machine industry, the apparatus is also suitable for use in small size vendors having small capacities such as home brewers, office brewers and the like. The various component parts of the apparatus of the present invention may be composed of metal, plastic or any other suitable material.

A frame is provided which supports the essential movable elements in the brewing of the beverage. The forces on the frame are minimized by use of the structure of the instant invention. The cams provided for operating the various component parts of the beverage brewing apparatus have been redesigned in order to effectuate more efficient operation of the apparatus. Furthermore, the cams have been correlated to minimize the load on the drive motor.

For the purpose of illustrating the invention there is shown in the drawings a form which is presently preferred; it being understood, however, that this invention is not limited to the precise arrangements and instrumentalities shown.

Figure 1:
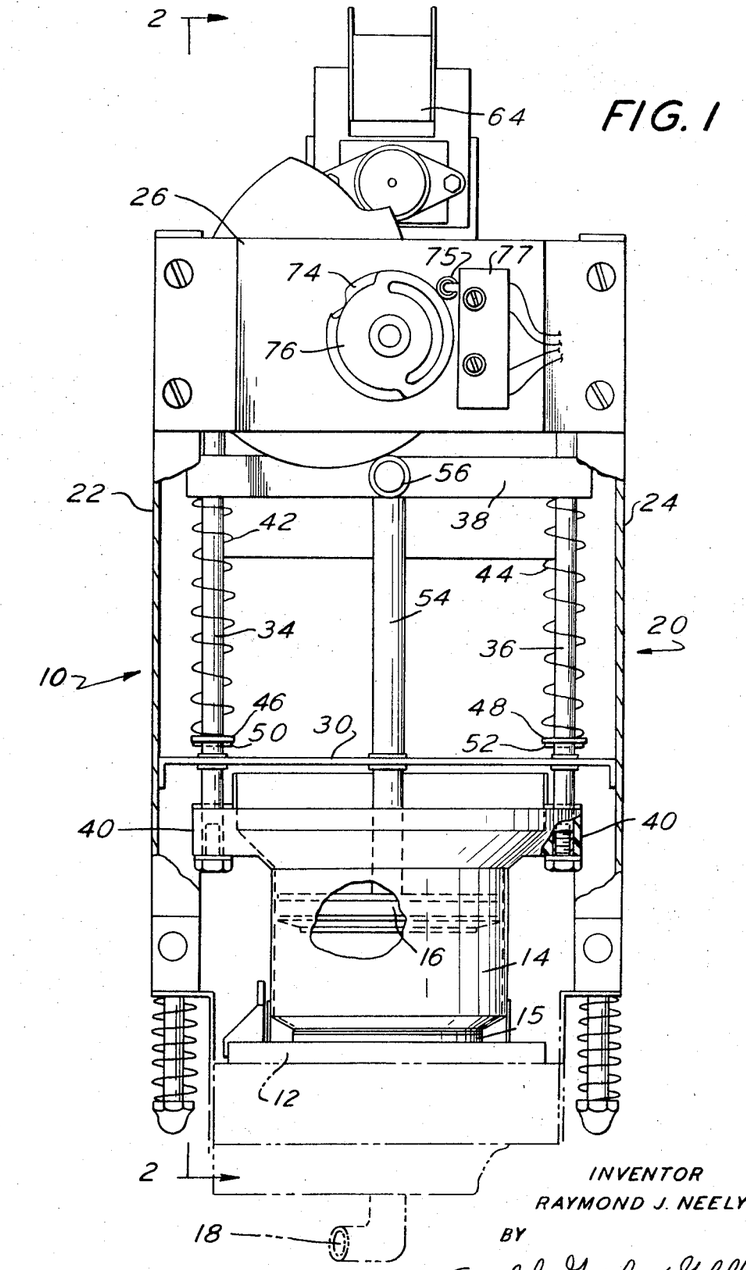
FIG. 1 is a front elevational view of a preferred form of the apparatus of the present invention.
Figure 2:
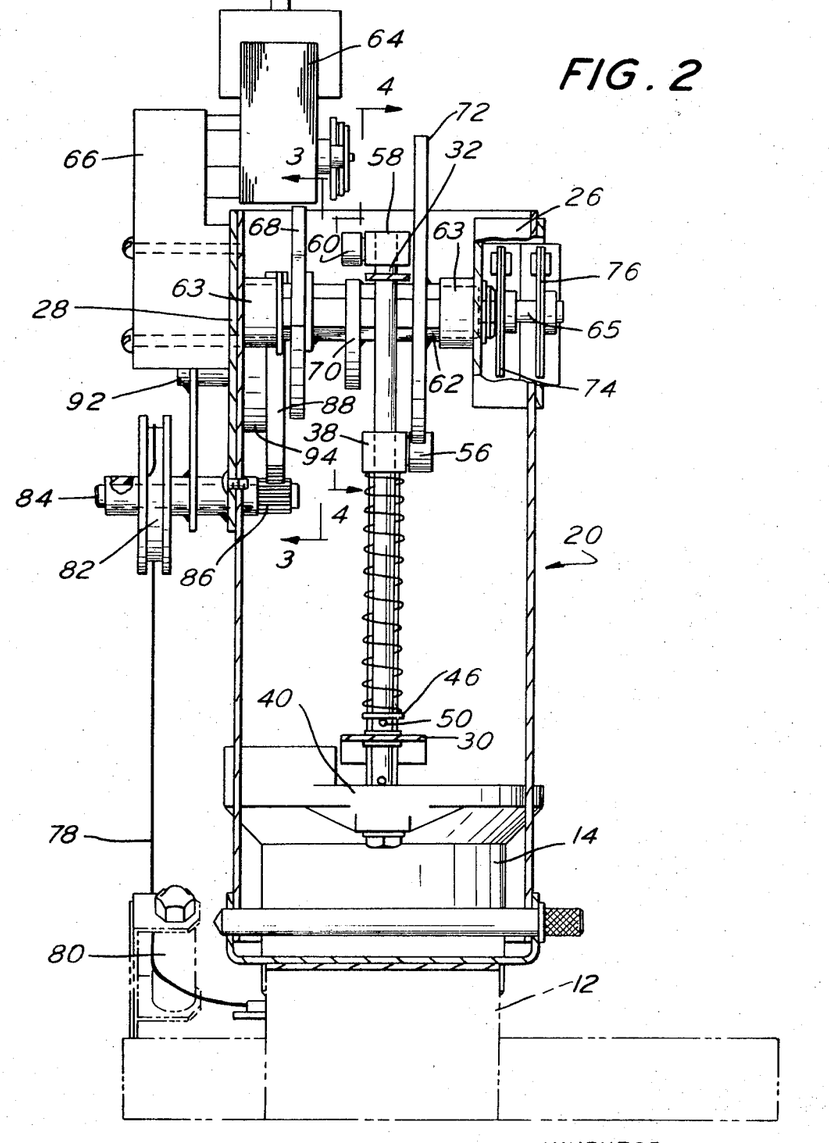
FIG. 2 is a section view taken along lines 2—2 of FIG. 1.

Referring now to the drawings in detail wherein like numerals indicate like elements throughout the several views there is shown in FIGS. 1 and 2 a brewing apparatus generally indicated by reference numeral 10.

For purposes of orientation, the basic portions of the apparatus will be briefly described before a detailed description of the apparatus is set forth.

Apparatus 10 includes a movable carriage 12 which, at the start of the brewing cycle, usually initiated by an electrical impulse which would be a coin operated switch or the like, moves a coffee carrying cup or brew cup 15 to a brewing station beneath the open end of a cylinder-shaped brew member 14. When the carriage is properly aligned beneath the cylinder, the cylinder moves downwardly into a watertight sealing engagement with the brew cup thereby forming a brewing chamber which is filled with hot water. Thereafter, piston 16 moves downwardly to force hot water and thereafter air through the ground coffee. The brewed beverage is dispensed through an outlet conduit 18 to a cup which is situated at a remote dispensing location.

Thereafter, the carriage 12 and the receptacle containing the spent coffee grounds are moved to the forward grounds ejecting position and the grounds are disposed of by a mechanism which is fully described in U.S. Pat. No. 3,349,690. U.S. Pat. No. 3,349,690 includes a complete description of the structure of carriage 12 and the means for ejecting spent coffee grounds. Accordingly, the structure of carriage 12 and the means for disposing of spent coffee grounds will not be set forth herein in detail.

Turning now to the more detailed description of the invention, the brewing apparatus is mounted in a housing 20. Housing 20 includes side plates 22 and 24, front plate 26 and a back plate 28. A lower support 30 and an upper support 32 extend between side plates 22 and 24 and are suitably secured thereto.

The housing 20 may be mounted within and form a part of conventional vending machine equipment.

The cylinder 14 is mounted for vertical movement by a pair of spaced rods 34 and 36. The spaced rods extend through a piston bridge 38 and are secured to diametrically spaced lugs 40 which are integrally formed with cylinder 14. The rods 34 and 36 may be threaded at their ends or may have tapped holes therein so that the rods may be suitably secured to the cylinder 14. The rods 34 and 36 are guided for axial movement by suitable bearings in holes provided in lower support 30. The rods extend upwardly through holes in piston bridge 38 and suitable bearings are provided in the piston bridge. The rods extend through holes in upper support 32 and are fixedly secured to a cylinder bridge 58. Suitable bearings for rods 34 and 36 are provided in upper support 32.

A pair of compression coil springs 42 and 44 are mounted on the rods 34 and 36, respectively. The rods 34 and 36 are provided with reaction washers 46 and 48 which are biased against fixed pins 50 and 52, respectively. Pins 50 and 52 extend through rods 34 and 36, respectively. One end of coil springs 42 and 44 bear against the piston bridge 38 at one end. The other end of springs 42 and 44 bear against the reaction washers 44 and 46, respectively.

Figures 3, 4:
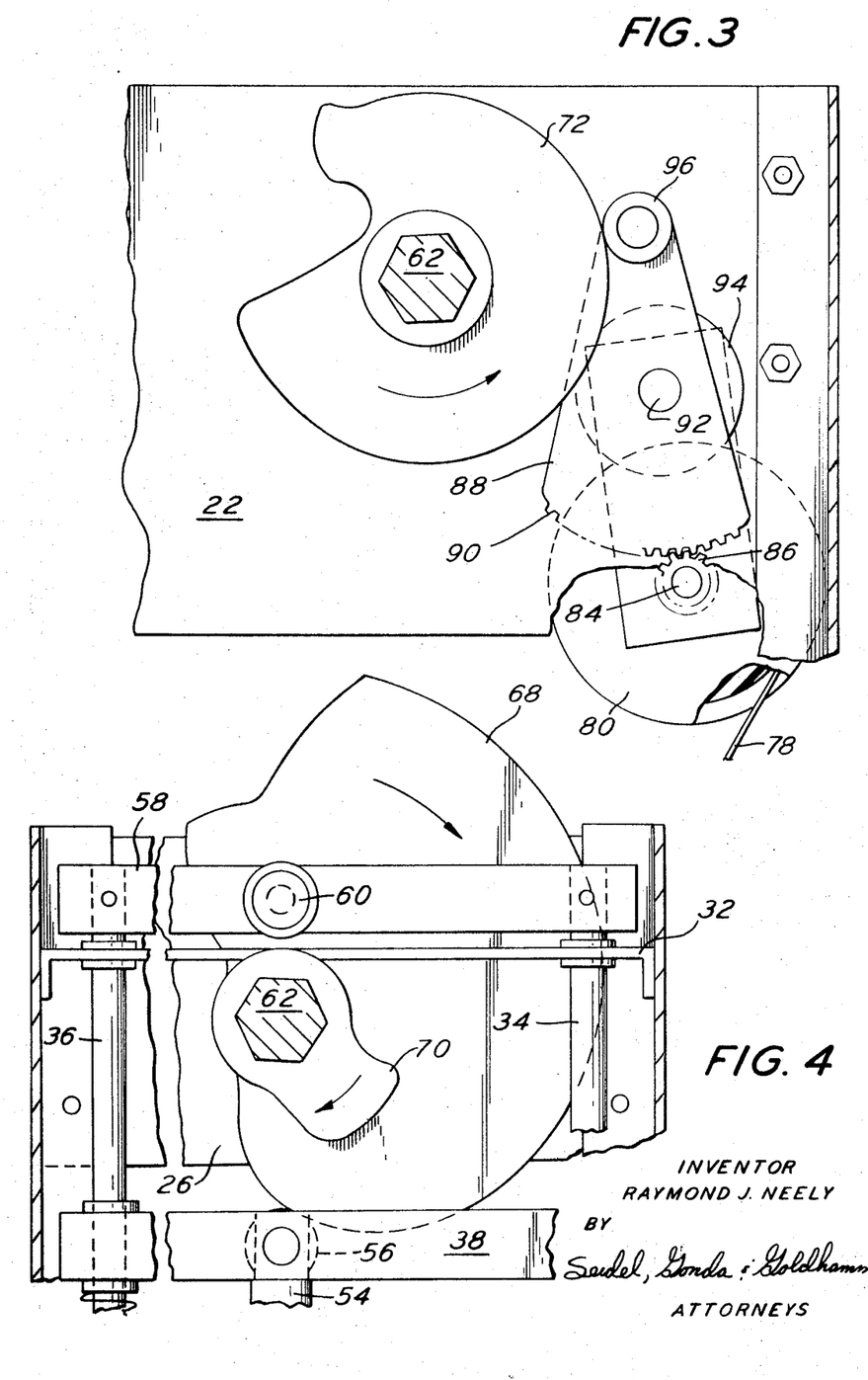
FIG. 3 is a section view taken along lines 3—3 of FIG. 2.
FIG. 4 is a section view taken along lines 4—4 of FIG. 2.

Referring now to FIG. 4, the piston 16 is fixed secured to a piston rod 54 which extends upwardly through lower support 30 and is guided by a suitable bearing in lower support 30 for axial movement. The uppermost end of the piston rod 54 is secured to the piston bridge 38. A cam follower 56 is fixedly secured to the piston bridge 38.

The cylinder bridge 58 to which the uppermost ends of rods 34 and 36 are secured has a cam follower 60 secured thereto.

A motor 64 is supported by back plate 28 and drives a hexagonal cam shaft 62 through a gear reduction box 66. The cam shaft 62 has piston cam 68, cylinder cam 70 and carriage cam 72, fixedly secured thereto. Shaft 62 is supported for rotation in bearings 63 and has a portion 65 extending through front plates 26. The portion 65 is preferably circular in cross section. A brew cycle cam 74 and a water cam 76 are fixedly secured to shaft portion 65. The cams 68, 70 and 72 may be welded or otherwise suitably secured to the cam shaft 62. Details of the cams will be discussed in connection with operation of the apparatus 10 hereinafter.

Referring now to FIGS. 2 and 3, a cable 78 is secured at one end to the movable carriage 12 (not shown) and extends around a roller 80 and has its other end secured to pulley 82. Pulley 82 is mounted on one end of shaft 84. The other end of shaft 84 includes a pinion 86 fixedly secured thereto. The pinion 86 is adapted to mesh with gear segment 88 which has teeth 90 thereon. The gear segment 88 is pivoted on a pivot shaft 92 which extends through the back plate 28 and is provided with a suitable nylon spacer 94 which extends between back plate 28 and gear segment 88.

The operation of the brewing apparatus will be initially set forth in general terms without a detailed discussion of the profile of cams 68, 70 and 72. Thereafter, the cam profiles and the correlation of cams 68, 70 and 72 will be discussed in detail.

Figure 5:
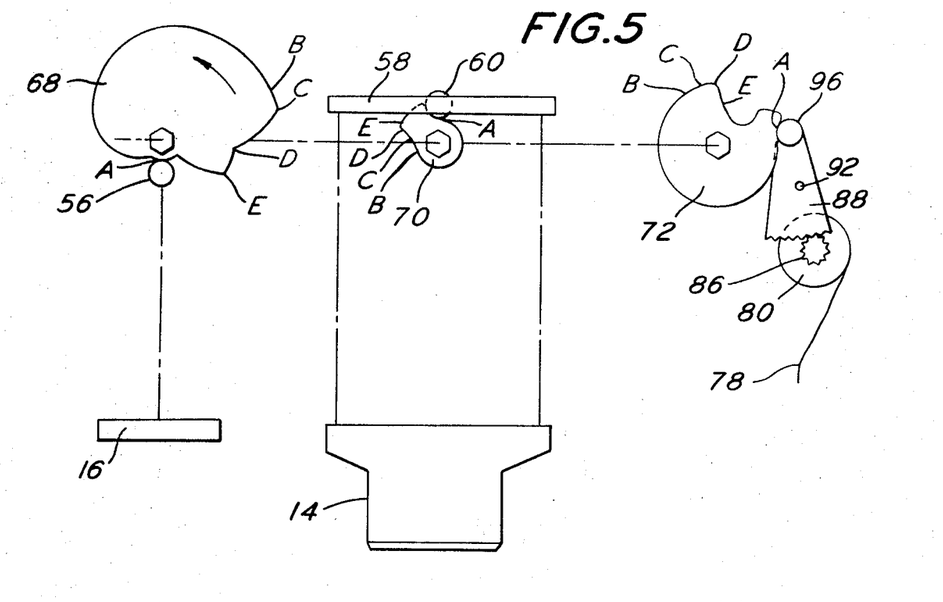
FIG. 5 is an exploded diagrammatic view of some of the operating elements of the beverage brewing apparatus of the present invention in a first orientation.
Figure 6:
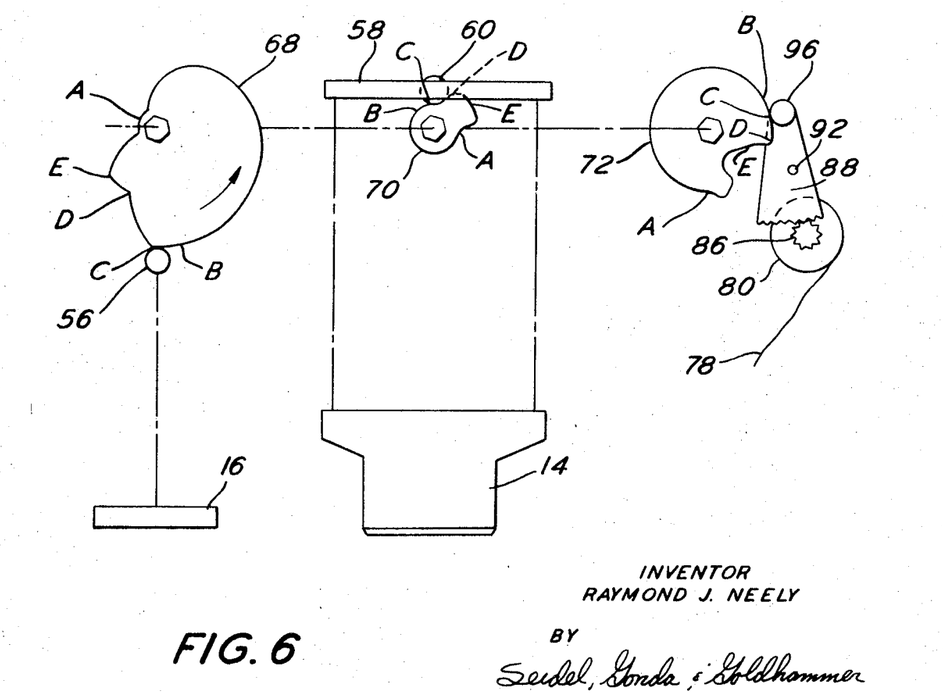
FIG. 6 is an exploded diagrammatic view of some of the operating elements of the beverage brewing apparatus of the present invention in a second orientation.

FIGS. 5 through 8 schematically show the orientation of the essential movable elements during a single cycle of the brewing apparatus. FIG. 5 schematically shows various elements of the brewing apparatus as the cylinder is moved into sealing position. FIG. 6 schematically shows various elements of the brewing apparatus when the piston has moved to the maximum extent of its downward stroke.

Figure 7:
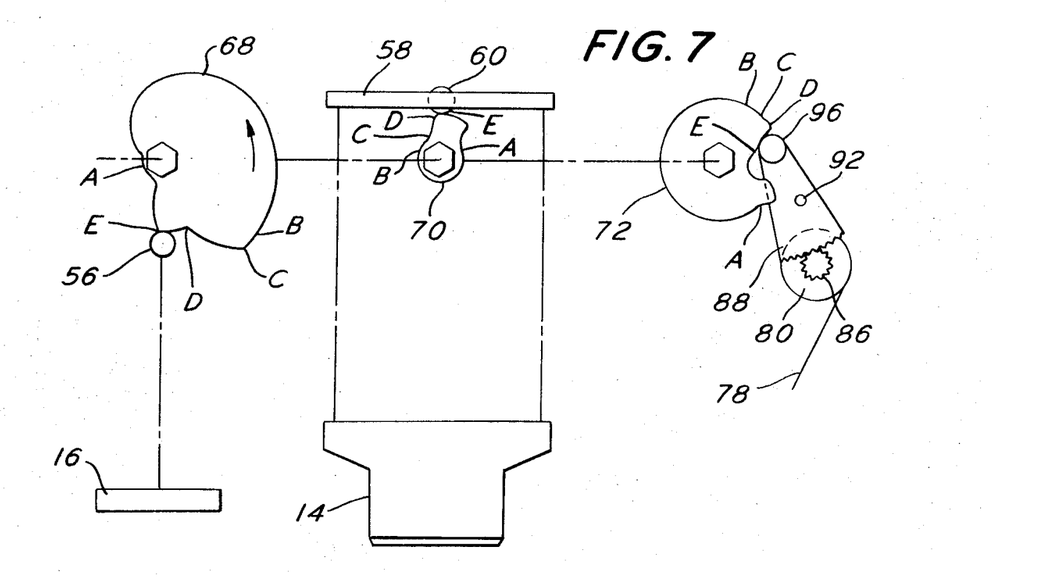
FIG. 7 is an exploded diagrammatic view of some of the operating elements of the beverage brewing apparatus of the present invention in a third orientation.
Figure 8:
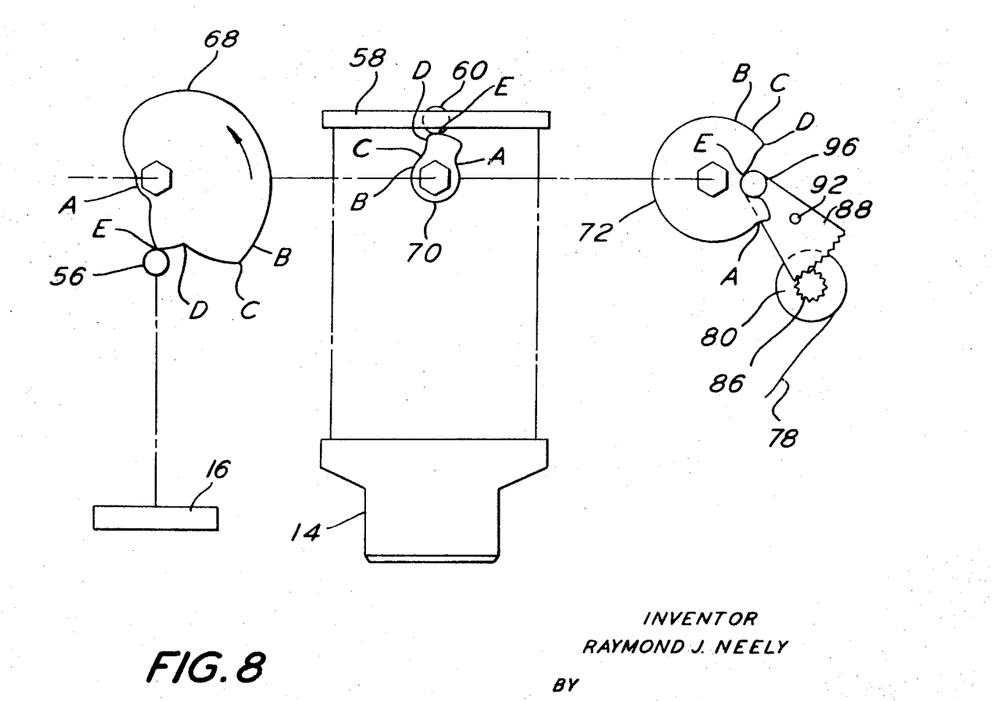
FIG. 8 is an exploded diagrammatic view of some of the operating elements of the beverage brewing apparatus of the present invention in a fourth orientation.

FIG. 7 schematically shows various elements of the brewing apparatus after the seal between the cylinder and the brew cup has been broken. FIG. 8 schematically shows various elements of the brewing apparatus after the spent grounds have been dumped from the brew cup and the carriage is about to be returned to the sealing position.

A suitable hopper is provided for delivering ground coffee into the brew cup carried by the carriage 12. The exact mechanism for accomplishing delivery of coffee to the brew cup forms no part of the present invention and is therefore not shown. Reference is again made to U.S. Pat. No. 3,349,690 for details of the structure of the brew cup, carriage, coffee hopper and augering mechanism, water feed mechanism and descriptions regarding the same which are substantially identical to those employed in the brewing apparatus of the present invention.

At the beginning of a cycle, the cylinder 14 will be sealed against the brew cup. The springs 42 and 44 provide a constant pressure to the cylinder 14 to insure sealing engagement between the cylinder and the brew cup. The cable 78 is slack since the carriage 12 is held in place by contact with the cylinder 14. The piston is in the extreme up position and at rest above and outside of the cylinder. Hot water is introduced into the cylinder and piston cam 72 forces piston 16 downwardly into the cylinder 14. The downward movement of the piston rod 54, the piston bridge 38 and piston 16 causes the springs 42 and 44 to be compressed.

Downward movement of the piston 16 also forces first the hot water and then the pocket of air formed between the hot water and the piston 16 through the ground coffee. The air will serve to dry the spent coffee grounds. As resulting pressure against the piston increases, the forces applied by the springs 42 and 44 also increases insuring a constant seal between the cylinder 14 and the brew cup 15.

After the beverage has been brewed, both the piston 16 and the cylinder 14 will move upwardly simultaneously. It is important that both move upwardly simultaneously. Hence, a movement of the cylinder without simultaneous movement of the piston would be substantially impossible since the springs 42 and 44 will be substantially completely compressed at the end of the stroke of the piston 16. Therefore, initial movement of the cylinder 14 without movement of the piston 16 would result in a crushing force and would be substantially physically impossible. Likewise, upward movement of the piston 16 while cylinder 14 maintains its seal would create a suction within the cylinder 14 and would draw grounds within the brew cup upwardly and hence result in both sloppy and inefficient operation of the brewing apparatus. Therefore, both the piston and cylinder initially move upwardly together until the seal between the cylinder and the brew cup is broken.

Thereafter, the piston 16 is moved up rapidly while the cylinder is merely moved sufficiently to clear the carriage 12 for movement to the ground dumping station. As the cylinder clears the carriage, carriage cam 68 permits the carriage to move to its ground dumping position.

After the grounds have been dumped from the brew cup, the carriage will be withdrawn to the sealing position. This is accomplished by carriage cam 68 causing rotation of pulley 82 thereby pulling the carriage back to the sealing position by movement of cable 78. As the carriage moves towards the sealing position, a charge of ground coffee is deposited into the brew cup. The cable will draw the carriage 12 beyond the sealing position and the cylinder 14 will be forced towards its sealing disposition by springs 42 and 44. Thereafter, the carriage will be released just prior to the cylinder returning to its seal position and the carriage permitted to move into abutting engagement with the cylinder. Accordingly, by permitting a surface on the carriage to contact the cylinder a perfect seal will be obtained during each cycle.

Each cycle is initiated upon sensing that a coin has been inserted into a suitable coin mechanism. Any other suitable mechanism may be employed to initiate the cycle. Cam 74 is provided to insure that each cycle terminates with all elements in their desired disposition. Cam 74 cooperates with a follower 75 attached to a conventional switch 77 which is used to terminate each cycle. Water will be inserted into the cylinder prior to movement of the piston into the cylinder. On-off controls for the hot water are provided by the cam 76. It is important to note that springs 42 and 44 always present a downward force upon the cylinder 14. After the carriage has returned to the sealing position and the cylinder has returned to its sealing position, the cycle is complete.

The profiles of the cams 68, 70 and 72 are interrelated to minimize reversal of moments and to provide as constant a torque load on the cam shaft and motor as possible. The cams are interrelated so that opposing moments are, for the most part, offset, or maintained in the same torsional direction.

Referring now particularly to the interrelationship between cams 68, 70 and 72, reference is made to FIGS. 5 through 8. Profiles of the cams have been referenced with letters which designate identical portions of the cycle for each of the cams.

FIG. 5 shows the cylinder 14 and piston 16 in the rest position with cylinder sealed. At this time, cable 78 is slack, point A of piston cam 68 contacts cam follower 56 and maintains the piston 16 at its uppermost position. Cam follower 60 secured to cylinder bridge 58 contacts point A of cylinder cam 70 permitting the cylinder 14 to be in substantially its lowermost position.

Point A of carriage cam 72 contacts cam follower 96. Cable 78 is slack since the carriage is held in the seal position by contact with cylinder 14.

Water cam 76 causes water to be introduced into cylinder 14 as piston follower 56 contacts the profile of cam 68 immediately adjacent point A on cam 68.

In FIG. 6, piston 16 has forced first the water and then the air through brew cup 15 and has already reached the end of its stroke and will start to move upwardly. At point B of piston cam 68 piston 16 will have reached the end of its stroke. At such time, the springs 42 and 44 will exert maximum pressure on cylinder 14 to thereby insure that cylinder 14 will remain in sealing engagement with the brew cup in the carriage. As Point C of carriage cam 72 contacts cam follower 96, there will be a slight movement of the follower 96 to take some slack out of cable 78.

The profile of piston cam 68 from B to C is such that the amount of upward motion of piston 16 will be identical to the amount of upward motion of the cylinder 14 caused by the profile of cylinder cam 70 from B to C. The cylinder and piston will rise together for approximately one thirty-second of an inch so that the seal between the cylinder 14 and the brew cup 15 may be broken. The profile from C to D on both cams 68 and 70 is designed so that the upward forces acting upon the piston bridge 38 caused by spring 42 and 44 develops an additional counterclockwise force on piston cam 68 and will aid in driving the cylinder cam to raise the cylinder 16. Should the piston rise prior to movement of the cylinder, there would be a suction of wet ground coffee which would severely interfere with desired functioning of the brewing apparatus. Due to the extreme force applied to the cylinder 14, it would be substantially impossible for the cylinder to move prior to movement of the piston 16. Accordingly, it is important to the proper function of the beverage brewing apparatus of the present invention for both the piston 16 and the cylinder 14 to move upwardly together until the seal is broken.

Thereafter, piston 16 will move upwardly at a much greater rate than cylinder 14. The moment transmitted to cam shaft 62 will be reversed from a clockwise moment to a counterclockwise moment as cam follower 56 travels from point C to point D on piston cam 68. At the same time, an opposing clockwise moment will be transmitted to cam shaft 62 as cam follower 60 travels from point C to point D on cylinder cam 70. There is little or no resultant moment applied to cam shaft 62 as cam follower 96 moves from point C to point D on cam follower 72.

Referring now to FIG. 7, as cam follower 96 passes over point D on carriage cam 72, a counterclockwise moment is applied to cam shaft 62. At the same time, cam follower 56 travels from D to E on piston cam 68. The profile of piston cam 68 from D to E provides a dwell so that no counterclockwise moment will act upon cam shaft 62 as a result thereof. Also, a clockwise moment acts upon cam shaft 62 as cam follower 60 travels from point D to point E on cylinder cam 70. Accordingly, the effect of the counterclockwise moment applied to cam shaft 62 as cam follower 96 travels from point D to point E on cam 72 is minimized.

In the disposition of the elements shown in FIG. 7, the cable 78 is taut and the carriage 12 has been released and is moving toward the position wherein grounds will be dumped.

Point E is a rise on carriage cam 72 which will serve to slow down the carriage 12 as it approaches the forward ground ejecting position. Hence, the carriage 12 which is spring biased to its forward position will not freely collide with fixed structure. It is to be understood that the carriage is constantly spring biased towards the forward ground ejecting position. The slowing of the carriage will help to prolong the life of the carriage parts and the parts utilized for ejecting the grounds. The slowing of the carriage also prevents splashing of the ejected grounds against adjacent structure. As cam follower 56 travels from E to A on cam 68, the moment applied to cam shaft 62 will be counterclockwise. The counterclockwise moment will be opposed by a clockwise moment on cam 72 applied by cam follower 96 to cam shaft 62 as cam follower 96 travels from E to A. As cam follower 96 travels from E to A, the greatest strain on the motor will be effected. Cam follower 60 will travel along a dwell and thereafter be released to permit the cylinder 14 to drop to its seal position as follower 60 follows the profile of cylinder cam 70 from E to A.

It is believed readily apparent from the preceding discussion that the reversal of moments on the cam shaft 62 are opposed wherever possible in order to minimize strain and snapping of the motor. By providing a constant downward bias for cylinder 14 and by careful designing of the cams utilized in the beverage brewing apparatus of this invention, forces on the motor are substantially reduced and a substantially smaller motor can be utilized than was previously possible. In the brewer disclosed in U.S. Pat. No. 3,349,690, the motor had to develop 168 inch pounds of torque to return the carriage 12 to the sealing position. In the apparatus of the present invention, only 99 inch pounds of torque are necessary.

The present invention may be embodied in other specific forms without departing from the spirit or essential attributes thereof and, accordingly, reference should be made to the appended claims, rather than to the foregoing specification as indicating the scope of the invention.

I claim:

1. A coffee brewing apparatus for use in a vending machine comprising a frame, upper and lower fixed supports secured to said frame, a hot water cylinder within said frame having an open top and an open bottom, a piston for reciprocating within said cylinder, means for biasing said cylinder into sealing position with a brew cup adapted to be filled with ground coffee, said means including spaced rods secured to said cylinder, said rods being guided for reciprocation through openings in said fixed supports, spring surrounding said rods one end of said springs surrounding said rods contacting fixed surfaces on said rods, said piston being supported by a piston rod, said piston rod being fixedly secured to a piston bridge, the other end of said springs contacting said piston bridge, means for moving said piston bridge towards said cylinder, said piston bridge further compressing said springs to increase the sealing force applied to said cylinder.

2. Apparatus as set forth in claim 1 including a cylinder bridge fixedly secured to the uppermost ends of said rods, a cylinder cam follower supported by said cylinder bridge, means for moving said piston and cylinder upwardly together simultaneously after a cup of coffee has been brewed.

3. Apparatus as set forth in claim 1 including a drive motor secured to said frame, a cam shaft operatively interconnected with said drive motor, a piston cam, a cylinder cam, and a carriage cam mounted on said cam shaft, the profiles of said cams being interrelated to minimize reversal of moments on said cam chaft and resultant snapping of said motor.

4. A coffee brewing apparatus for use in a vending machine comprising a frame, a hot water cylinder within said frame having an open top and an open bottom, a piston for reciprocating into and out of said cylinder, means for biasing said cylinder into sealing position with a brew cup adapted to be filled with ground coffee, the brew cup being carried in a carriage adapted to be moved between a seal position and retracted spent ground dumping position, a drive motor secured to said frame, a cam shaft operatively interconnected with said drive motor, a piston cam, a cylinder cam, and a carriage cam fixedly secured to said cam shaft, piston being supported by a piston rod, said piston rod being fixedly secured to a piston bridge, said piston bridge having a piston cam follower fixedly secured thereto, said cylinder being interconnected with a cylinder bridge to move therewith, a cylinder follower secured to said cylinder bridge, said cylinder bridge and said piston bridge being mounted for reciprocation within said frame, a carriage cam follower supported by said frame, said carriage cam follower being adapted to cause said carriage to be retracted to its sealing position, profiles of said piston cam, cylinder cam and carriage cam being interrelated to minimize the effect of the reversal of moments applied to said cam shaft, said piston cam follower exerting a clockwise moment on said cam shaft as said piston is moved downwardly into said cylinder, said piston cam follower applying a counterclockwise moment to said cam shaft as said carriage and cylinder cam followers apply a clockwise moment to the cam shaft as said piston is reciprocated out of said cylinder and said cylinder cam follower applying a clockwise moment to said cam shaft as said carriage cam applies a counterclockwise moment to said cam shaft as said carriage is moved to its retracted ground dumping position.

5. Apparatus as set forth in claim 4 wherein said piston cam follower applies a counterclockwise moment to said cam shaft as said piston continues its movement to the maximum position out of said cylinder while said carriage cam follower applies a clockwise moment to said cam shaft as said carriage is returned to the seal position.

6. Apparatus as set forth in claim 4 wherein said piston cam and said cylinder cam have identical parallel motion portions to move said piston and cylinder away from the seal position simultaneously, said identical parallel motion moving said piston and cylinder together approximately one thirty-second of an inch.

* * * * *

UNITED STATES PATENT OFFICE
CERTIFICATE OF CORRECTION

Patent No. 3,660,117          Dated May 2, 1972

Inventor(s) Raymond J. Neely

It is certified that error appears in the above-identified patent and that said Letters Patent are hereby corrected as shown below:

Column 2, line 67, "44 and 46" should read -- 46 and 48 -- . Column 3, line 59, "72" should read -- 68 -- . Column 4, lines 14 and 18, "68" should read -- 72 -- .

In Figure 2 of the drawing "68" should read -- 72 -- and "72" should read -- 68 -- .

Signed and sealed this 26th day of December 1972.

(SEAL)
Attest:

EDWARD M. FLETCHER, JR.　　　　　　　ROBERT GOTTSCHALK
Attesting Officer　　　　　　　　　　　Commissioner of Patents